TAPE GUIDE AND STORAGE DEVICE

Filed Aug. 19, 1964 4 Sheets-Sheet 1

JACK K. WILLIS
INVENTOR.
BY Robert L. Clay
ATTORNEY

TAPE GUIDE AND STORAGE DEVICE

Filed Aug. 19, 1964

4 Sheets-Sheet 2

JACK K. WILLIS
INVENTOR.

BY Robert G. Clay

ATTORNEY

Dec. 6, 1966 J. K. WILLIS 3,289,960

TAPE GUIDE AND STORAGE DEVICE

Filed Aug. 19, 1964 4 Sheets-Sheet 3

JACK K. WILLIS
INVENTOR.

BY Robert G. Clay

ATTORNEY

JACK K. WILLIS
INVENTOR.

BY Robert H. Clay

ATTORNEY

United States Patent Office 3,289,960

Patented Dec. 6, 1966

3,289,960

TAPE GUIDE AND STORAGE DEVICE

Jack K. Willis, San Bruno, Calif., assignor to Ampex Corporation, Redwood City, Calif., a corporation of California Filed Aug. 19, 1964, Ser. No. 390,667
19 Claims. (Cl. 242—55.12)

This invention relates to tape feeding mechanisms, and particularly to tape guiding and storage means therefor.

In the magnetic tape recording and reproducing art, a continuing problem has been to provide constant speed and tension in the tape as it is moved past a transducing head assembly, so as to avoid variations in the frequency of the recorded or reproduced signal. Another problem has been to provide for rapid start, stop and reversal of tape motion. A common solution adapted has been to provide a capstan for metering the tape and a pair of reels for storing the tape, together with a pair of slack take-up and tensioning means, such as vacuum tape loop columns, between the reels and capstan to maintain constant tape tension while absorbing the differences in speed-change response that characterize the reels and tape stored thereon, and the capstan and the segment of tape between the reels. A third problem associated with such devices has been that of edge-guiding the moving tape in such a way that the tracks thereon are always laterally aligned with the correct transducing heads, without caus-unnecessary edge wear and destruction of the tape.

Previously in the art, the storage means have been elongated vacuum columns into which a bend of tape is drawn. A pair of tape guide posts or bearings are provided at the open end of the column. If the tape loop is shortened to the extent that it is drawn out of the column, the pressure differential may be destroyed, so a pair of stop pins are often provided within the bend of the tape to limit this action. However, the initial threading of tape between the bearings and the stop pins is an unnecessarily difficult procedure. The size and shape of the long vacuum columns requires an untoward amount of space, particularly if the columns are to be oriented with relation to the reels and capstan so as to provide the minimum angle of frictional wrap of the tape around the bearings. Even if the bearings are rollers, the tapes rubs frictionally on the sides of the column. The use of suction causes dirt and debris from the tape and atmosphere to be sucked into the apparatus. Furthermore and most important, the tape loops in such columns in normal operation have long, straight shanks nearly parallel to the sides of the column, and the centering effect of the air flow around the edges of the loop in the column is not satisfactorily transmitted through these easily-twisted straight shanks to the portions of tape at the bearings. As a result, the tape at the bearings and at the transducing heads may wander laterally out of alignment with the heads unless flanged edge guides are used, which cause frictional edge wear of the tape.

Accordingly, it is an object of this invention to provide a new and improved tape feeding mechanism.

It is another object of this invention to provide a tape guide and storage device in which the tape is maintained in correct lateral alignment with the heads without edge wear.

It is another object of this invention to provide a tape guide and storage device that occupies a minimum amount of space and at the same time provides for minimum wrap of the tape on guiding elements and minimum of zero frictional wear.

It is another object of this invention to provide a tape guide and storage device that is easy to thread with tape and to maintain in a clean condition.

A device in accordance with the invention includes at least one elongated pressurized air manifold extending substantially tangentially from the peripheral zone of a reel and to the capstan and confronting the tape segment between the reel and capstan so as to blow this segment away from the manifold and to form the segment into a curved bend of less than 180° arc, with the ends of the tape segment engaging or nearly engaging the ends of the manifold as bearings. A pair of flat parallel walls extend from the manifold and confront the two edges of the tape segment. These walls are spaced slightly from the tape edges, and the pressurized air leaking between the tape and walls tends to keep the tape centered on the bearings. A sensing means is provided to control the feeding of the tape by the reels so as to maintain a predetermined amount of tape in the loop, and to confine the loop always to an arc of less than 180°.

The invention will be described in greater detail with reference to the drawing, in which.

Figure 1:
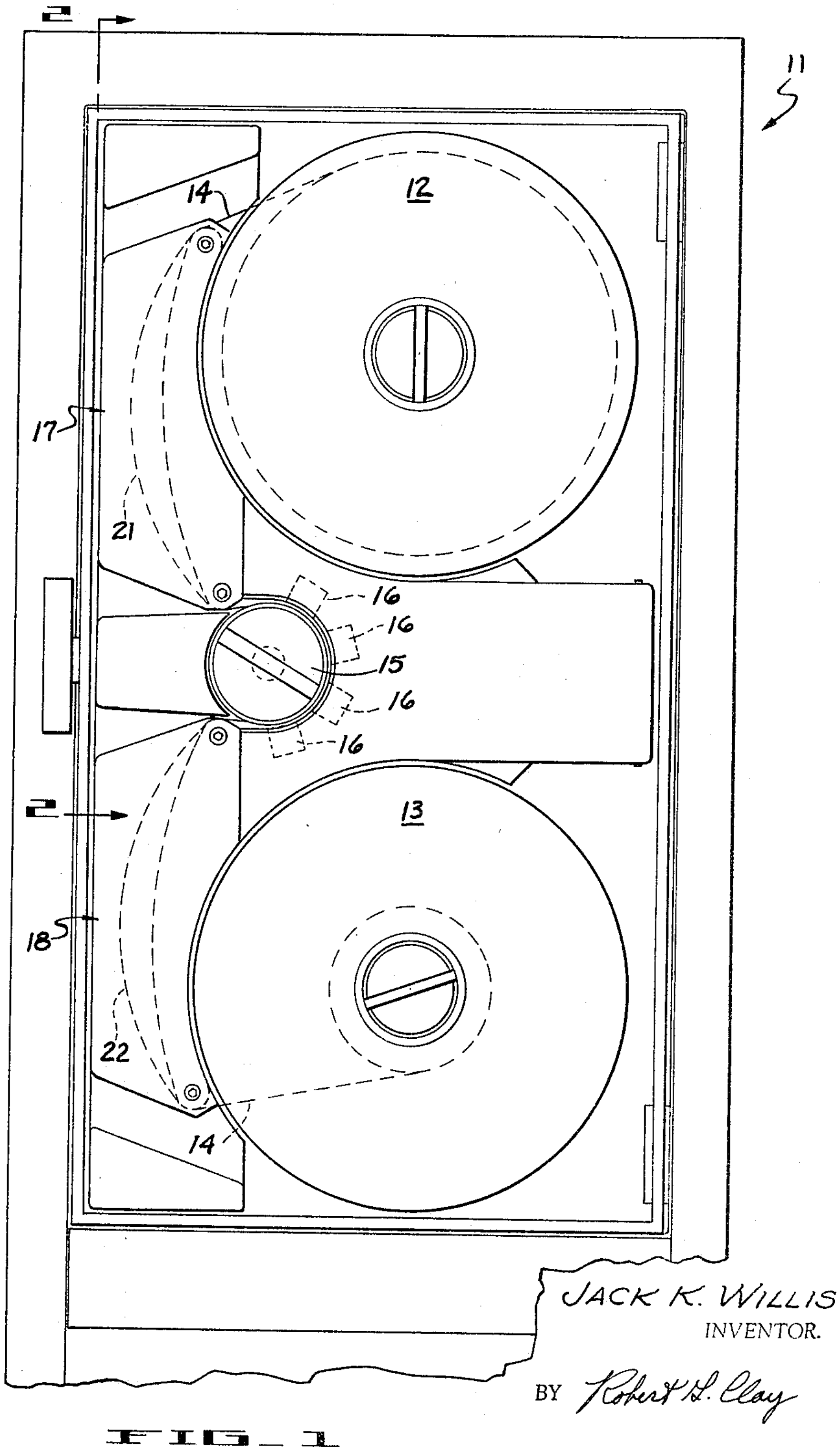
FIGURE 1 is a front elevation of a magnetic tape recording and reproducing machine incorporating the invention.

Referring now to the drawing and particularly to FIGURE 1, there is shown a magnetic tape recording and reproducing machine 11 including a pair of reels 12 and 13 on which is wound and secured a tape 14. A reversible capstan 15 meters the tape past a series of transducing heads 16 arranged substantially as disclosed in co-pending application S.N. 245,570, "Transducing Apparatus" by Jack K. Willis, filed December 18, 1962. When the tape is moving in a "forward" direction (i.e. from reel 12 to reel 13), then reel 12 is the supply reel and reel 13 is the takeup reel. When the tape is moving in the "reverse" direction, from reel 13 to reel 12, then reel 13 is the supply reel and reel 12 is the takeup reel. A pair of tape storage and guiding devices 17 and 18 are provided, which dispose the tape in a pair of storage or buffer segments 21 and 22, tensioned by an air pressure differential, so that the segments 21, 22 are free to lengthen or shorten as needed. For example, on starting forward, the tape at the capstan begins to move while the reels remain stationary, so that the segment 21 is shortened and the segment 22 is lengthened. This change in the lengths of the segments 21, 22 is sensed by means, later to be described, forming part of the devices 17, 18; and the sensing is used to initiate rotation of the reels, so that the lengths of the segments 21, 22 are re-established at a predetermined intermediate length. When the machine is stopped or reversed after forward operation, or when it is started in a reverse direction, the segment 22 grows temporarily shorter and the segment 21 grows temporarily longer.

Figures 2, 3:
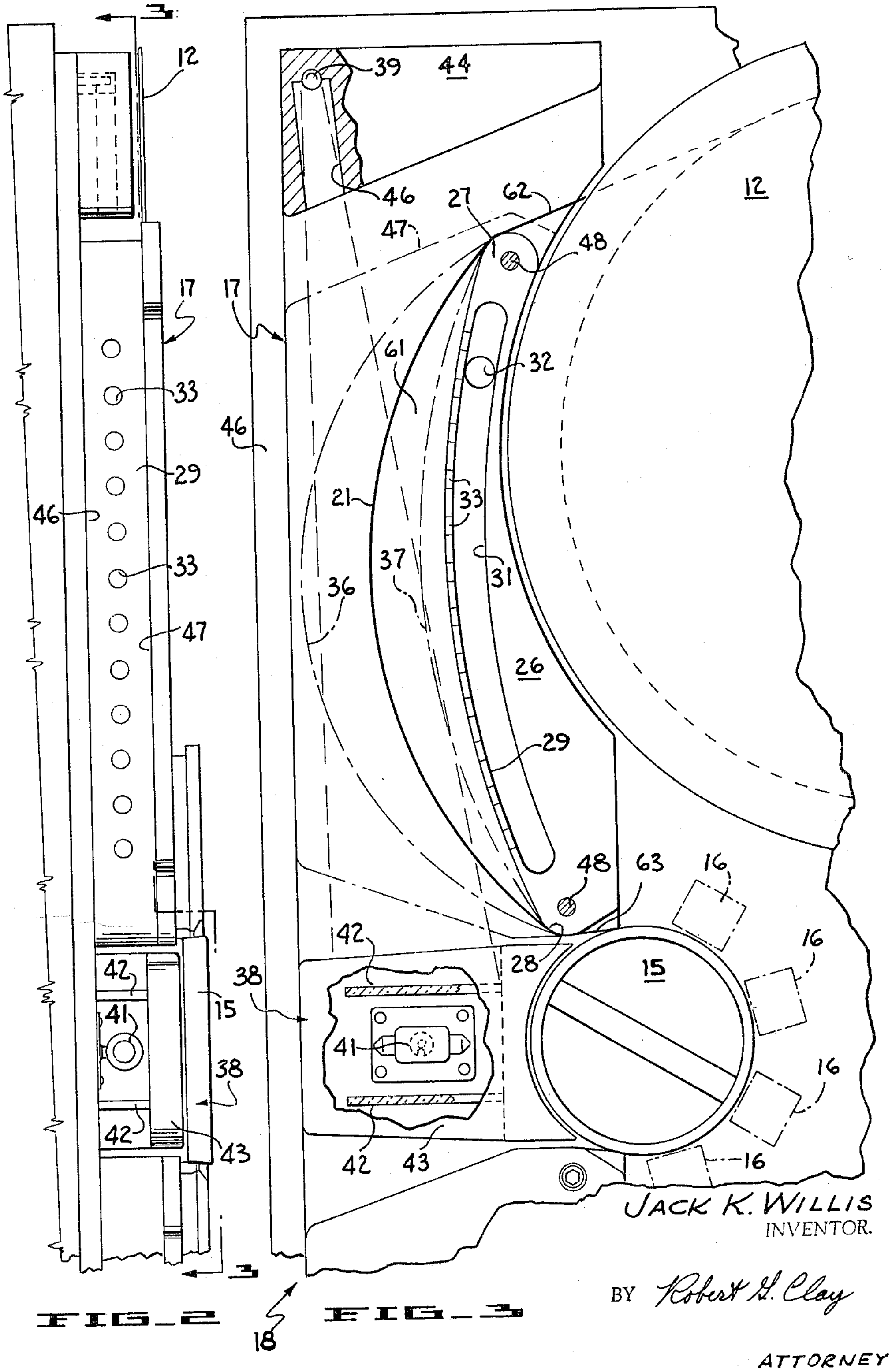
FIGURE 2 is a fragmentary side sectional elevation to an enlarged scale and taken on the plane of lines 2—2 of FIGURE 1.
FIGURE 3 is a fragmentary front sectional elevation to said enlarged scale and taken on the plane of lines 3—3 of FIGURE 2.

In FIGURES 2 and 3 is shown the construction of the device 17. To provide the differential air pressure needed to distend and tension the tape segment 21, an elongated pressurized air manifold 26 is mounted in substantially tangential relation to the periphery of reel 12 and extending along the tape path to a point adjacent the capstan 15, so as to take the fullest advantage of the space available between the reel and capstan, without occupying more space than would be needed if no differential pressure mechanism were used. Furthermore, this arrangement provides for the minimum practical frictional engagement of the tape with the necessary guiding and bearing elements, which are here shown as rounded portions at the ends of the manifold 26, defining a pair of spaced bearings 27 and 28, which in turn define the segment 21 of the tape.

To take the best advantage of the space available, and to direct the pressurized air as nearly as possible in a direction normal to the desired curve of the tape segment 21, the manifold 26 is provided with a convexly outwardly curved wall 29, which confronts the tape and in part defines a hollow interior chamber 31 of the manifold. Pressurized air is supplied to the chamber 31 through an inlet port 32 in the back wall of the manifold, and the air is directed against the tape through a plurality of outlet ports 33 formed in the length of the wall 29. These ports 33 are most clearly shown in FIGURE 2, from which the tape has been omitted for the sake of clarity.

To control the amount of tape in the curved segment of tape 21, so as to return the segment to an intermediate position (illustrated by the solid line in FIGURE 3) from either of the extreme positions (illustrated by dashed lines 36 and 37) to which the segment may be moved during starting, stopping and reversing, a sensing means is provided, here shown as comprising a light source 38 and a photocell 39, each positioned adjacent one of the bearings 27, 28 so that a portion of the light from the source is masked from the photocell by the tape segment 21, in an amount that varies as a function of the amount of tape in the segment. The resulting signal from the photocell is used to control the rotation of reel 12, in a manner hereinafter described, to maintain the segment 21 at the desired length and position.

A feature to be noted in FIGURE 3 is that the structure and arrangement previously described, of the elongated manifold 26 tangential to the reel and extending to the capstan, enables the use of a single inexpensive light bulb 41, of a type that is widely manufactured and commercially available, for continuous sensing of both tape segments 21 and 22. Photoelectric sensing devices previously used with the standard suction tape columns of the art were generally of two types. Either they embodied a number of light sources and photocells arranged along the length of the column viewing the tape transversely to its length and providing discrete and non-continuous sensing of the length of the tape loop, or they required elongated light sources and photocells arranged along the length of the column to give continuous sensing. However such elongated devices had to be especially manufactured for the purpose and were expensive to provide and to replace. The arrangement of the present invention disposes the light beam to the photocell substantially enfilading the length of the tape segment 21, covering the entire range of tape movement and providing continuous sensing with a substantially point-source photocell and point-source light bulb. To evenly distribute the light however, a pair of translucent or frosted window panels 42 are mounted on either side of the light bulb 41.

The light source 38, which is capable of serving both tape segments 21 and 22, is mounted centrally between the segments, while the photocells 39, which are individually allocated to the respective segments, are mounted at the two extremities of the tape path. The light bulb 41 is protected by a cover 43, and the photocells 39 are mounted in islands 44 at the end of a deep channel 46 having blackened walls, which limits the field of vision of the photocell to that needed for sensing the curved tape segment, and minimizes the effect of ambient light changes. Consequently, reference photocells, common in the art, are ordinarily not needed in the present invention, although they can be provided.

It will be understood that the device 18 is substantially a mirror image of the device 17, and includes all the same parts, also in mirror image construction.

Figure 4:
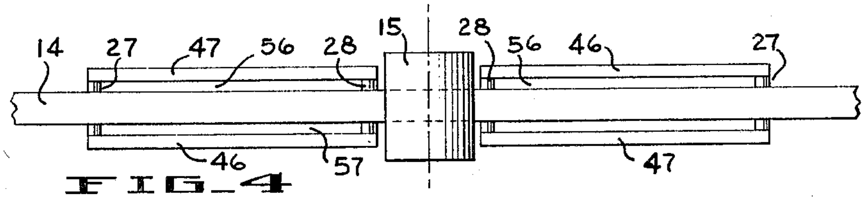
FIGURE 4 is a schematic view illustrating the operation of the invention.

Each device 17, 18 combines with its tape storage function a second function that relates to the edge guiding of the tape. A pair of parallel walls 46 and 47 are provided confronting the edges of the tape segment 21 and spaced very slightly therefrom, e.g., for a few thousandths of an inch. The back plate 46 is in actuality the "top plate" of the machine, on which are solidly mounted the manifold 26 (as by pins 48), the island 44, and the light source assembly 38. The front plate 47 is a separate element extending from the manifold 26, and mounted solidly thereon by the pins 48. As shown schematically in FIGURES 4–6, the plates 46, 47, in cooperation with the bearings 27, 28 and the pressurized air from the manifold 26, maintain the tape 14 in a centered path in relation to the capstan 15 and heads 16, even if the capstan is out of alignment. The desired path is shown in FIGURE 4, which is taken from substantially the same direction as FIGURE 2, with a capstan that is perfectly aligned, with its axis perpendicular to the plane of the desired tape path.

Figure 5:
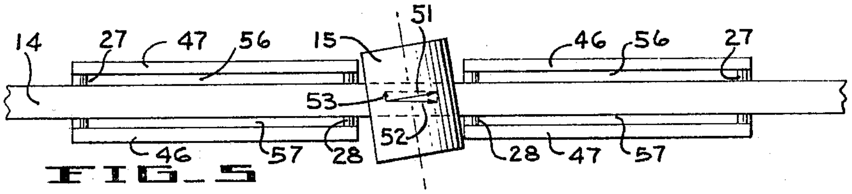
FIGURE 5 is a schematic view illustrating the operation of the invention.
Figure 6:
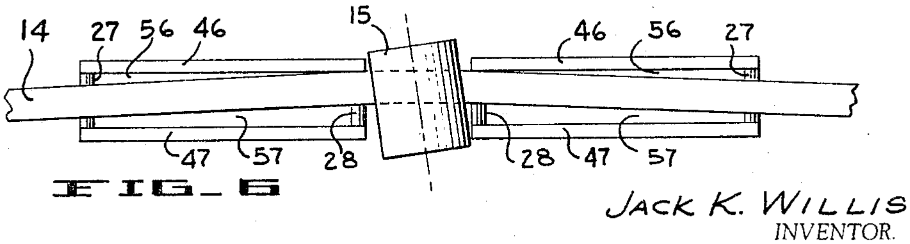
FIGURE 6 is a schematic view illustrating a problem overcome by the invention.

If, however, the capstan is misaligned as shown in exaggerated degree in FIGURE 5, the frictional driving force 51 of the capstan on the tape has a tape-advancing component 52 operating in the direction of the length of the tape, and an axial tape-driving component 53 that tends to drive the tape in one axial direction so that, if further corrective steps were not taken, the tape would move to the position shown in FIGURE 6, with one edge frictionally rubbing against plate 46. It is virtually impossible, during the manufacturing process, to align the capstan so that there is absolutely no axial driving force produced; and even if such accuracy were possible, the capstan can easily be knocked out of alignment during ordinary service.

Of course, when the tape is positioned as shown in FIGURE 6, no further axial migration of the tape would take place, and the heads 16 could be temporarily aligned to follow the correct tracks on the tape. However, this condition is undesirable for several reasons. First, the tape is weakest at its edges, and frictional rubbing of the edges produces fraying and curling, eventually ruining the tape for further use. Second, as the curling of the tape edge progresses with repeated use, the tape tends to be even further axially displaced on the capstan, so that no position can be chosen for the heads in which the heads are permanently aligned with the correct tracks. Third, upon reversal of tape motion, the tape is driven in the opposite axial direction and becomes very greatly misaligned with respect to the heads.

It will be understood that the undesirable condition shown in FIGURE 6 is not representative of the end effect of the present invention, but only of a problem that the present invention overcomes. This problem is one that characterizes the prior art. For example, if the plates 46, 47 did not exist, and the bearings 28 were merely flanged guide posts, as in the prior art, a condition similar to that of FIGURE 6 would result. The advantage of the present invention is that a pair of widely spaced bearings 27, 28 are used, with a pair of long plates 46, 47, spanning a considerable segment of the tape length between the bearings (in fact the longest segment that can be practically spanned in the configuration shown in FIGURE 1), and pressurized air is exuded through the spaces between the plates and tape edges with sufficient force and flow to maintain the tape substantially centered between the plates. The spacings 56, 57 between the tape edges and the plates are shown in FIGURES 4–6 as considerably exaggerated for the sake of clarity. It will be seen in FIGURE 6 that the space 56 is considerably smaller in area than the space 57, so that in effect the spaces constitute orifices for the flow of the pressurized air, with the orifice 56 being considerably more restricted than the orifice 57. A pressurized fluid flowing through a restricted orifice flows with a higher speed and exerts a greater lateral pressure against the walls of the orifice as the orifice is reduced in size. One edge of the tape 14 constitutes a side of orifice 56 and the other edge of the tape constitutes a side of the orifice 57. Consequently a greater pressure is exerted against the tape by the air flowing through orifice 56 than by the air flowing through orifice 57. This imbalance of pressure and force has a resultant urging the tape to move toward the center position until the resultant force exerted by the air is reduced and balanced by the axial driving force 53, as shown in FIGURE 5. The tape is thus guided along substantially the same path, out of contact with the plates 46, 47 and continuously substantially aligned with the heads 16, under all conditions of operation of the machine.

It will be understood that the structure above described is equally effective in guiding the tape in a centered path when the reels 12 and 15 are imperfectly aligned.

Figure 8:
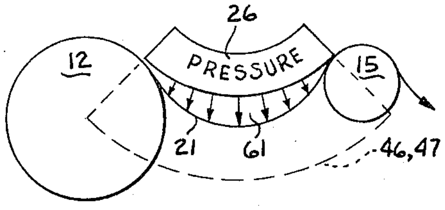
FIGURE 8 is a schematic view illustrating another form of the invention.
Figure 9:
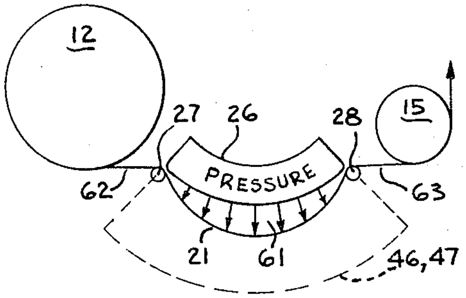
FIGURE 9 is a schematic view illustrating still another form of the invention.

A feature contributing to the above-described result is the substantial engagement of the tape with the bearings 27, 28, sealing this possible avenue of escape for the pressurized air and enabling the tape, plates and manifold to define an enclosed pressure chamber 61 (FIGURES 3 and 7–9, for example) from which the pressurized air can escape only by leaking through the orifices or spaces 56, 57 between the tape and plates. Several arrangements for producing this effect are shown in FIGURES 7–9.

Figure 7:
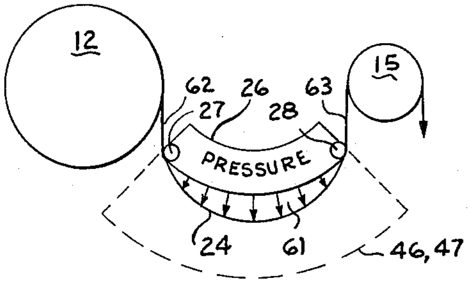
FIGURE 7 is a schematic view illustrating one form of the invention.

In the arrangement of FIGURE 7, the portion 62 of tape approaching the bearing 27 is parallel to the portion 63 of tape leaving the bearing 28. So long as the arc of the tape segment 21 is less than 180°, the tape is urged against the bearings 27, 28 in a sealing relationship. The pressure in the chamber 61 produces a hoop tension in the tape that is proportional to the product of the pressure and the radius of curvature of the tape. Since the radius of curvature of the tape around the bearings 27, 28 is smaller than the radius of curvature of the tape in the segment 21, it follows that the normal force exerted by the tape against the bearings 27, 28 is greater than the normal force exerted by the air against the tape in the region of the bearings. Consequently, the pressurized air cannot force its way between the tape and bearings, and this exit is effectively sealed. If the arc of tape segment were greater than 180°, however, the radius of curvature around the bearings would become infinitely great and the seal would be broken. Consequently, it is of great importance to control the amount of tape in the segment 21 so that the arc is less than 180° when the tape portions 62, 63, approaching and leaving the bearings, are parallel.

When the portions 62, 63 are slightly converging toward the segment 21, as shown in FIGURE 3, then the arc of the segment 21 must be maintained at a correspondingly smaller limiting value, substantially less than 180°. When the portions 62, 63 are diverging toward the segment 21, then there is no upper limit to the size of the tape arc. However, in all possible configurations, a common condition is that the amount of tape in the segment 21 must be such that the tape has a substantial angle of wrap around the bearings 27, 28, and the expression of this condition is one of the simplest ways to define the structural relationships that produce effective operation of the invention.

One further distinguishing feature of the present invention is that the centering and guiding effect of the pressurized air is applied to every portion of the tape available between the reel and capstan so that a more effective result is provided with less expenditure of energy. The structure also provides for application of the center-guiding effect as close to the capstan as possible. In this connection it may be observed that the maintaining of the tape segment 21 in a continuously curved condition, with the air leaking between the tape and plate at all points between the bearings, has the added advantage that the structural rigidity of the tape is increased. The tape segment 21 responds to the centering forces more as a rigid structural member when it conforms to a curved cylindrical surface, than it would in the conformations previously known. For example, the well-known tape loop associated with the vacuum or suction column has a small curved portion and two long straight shanks. In such a device, centering action can be provided only at the small curved portion, where the air flows, for no appreciable flow of air takes place around the edges of the straight shanks. Thus the centering action can take place only remote from the capstan and may be dissipated as by twisting of the straight shanks, so that the tape in the vicinity of the capstan is not effectively centered.

Figure 10:
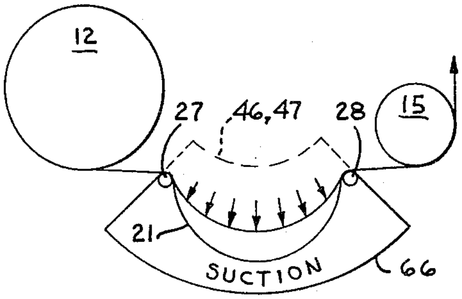
FIGURE 10 is a schematic view illustrating yet another form of the invention.

It will of course be understood that the bearings 27, 28 may be roller bearings so as to eliminate all frictional wear and vibration of the tape, or the bearings may be externally (independently) pressurized air or fluid bearings such as are commonly known in the art. If such externally pressurized bearings are used, the fluid pressure required would necessarily be greater than the pressure of the air in chamber 61, and this condition equally well seals the ends of the chamber against escape of the air supplied by manifold 26. In this connection, it may be observed that at sufficiently high tape speeds a self-acting air bearing condition may be created at the bearings 27, 28, but again the bearing pressure that is established is sufficiently great to form effective seals at the ends of the chamber 61. It will be further understood that arrangements such as that shown in FIGURE 8 may be used, in which the bearings are formed by the reels and capstan themselves, or that shown in FIGURE 10, in which the pressure differential is established by a suction manifold 66 instead of a pressure manifold. The use of a pressure manifold, however, has the advantagge that dirt and debris is blown out of the machine instead of being drawn in.

Figure 11:
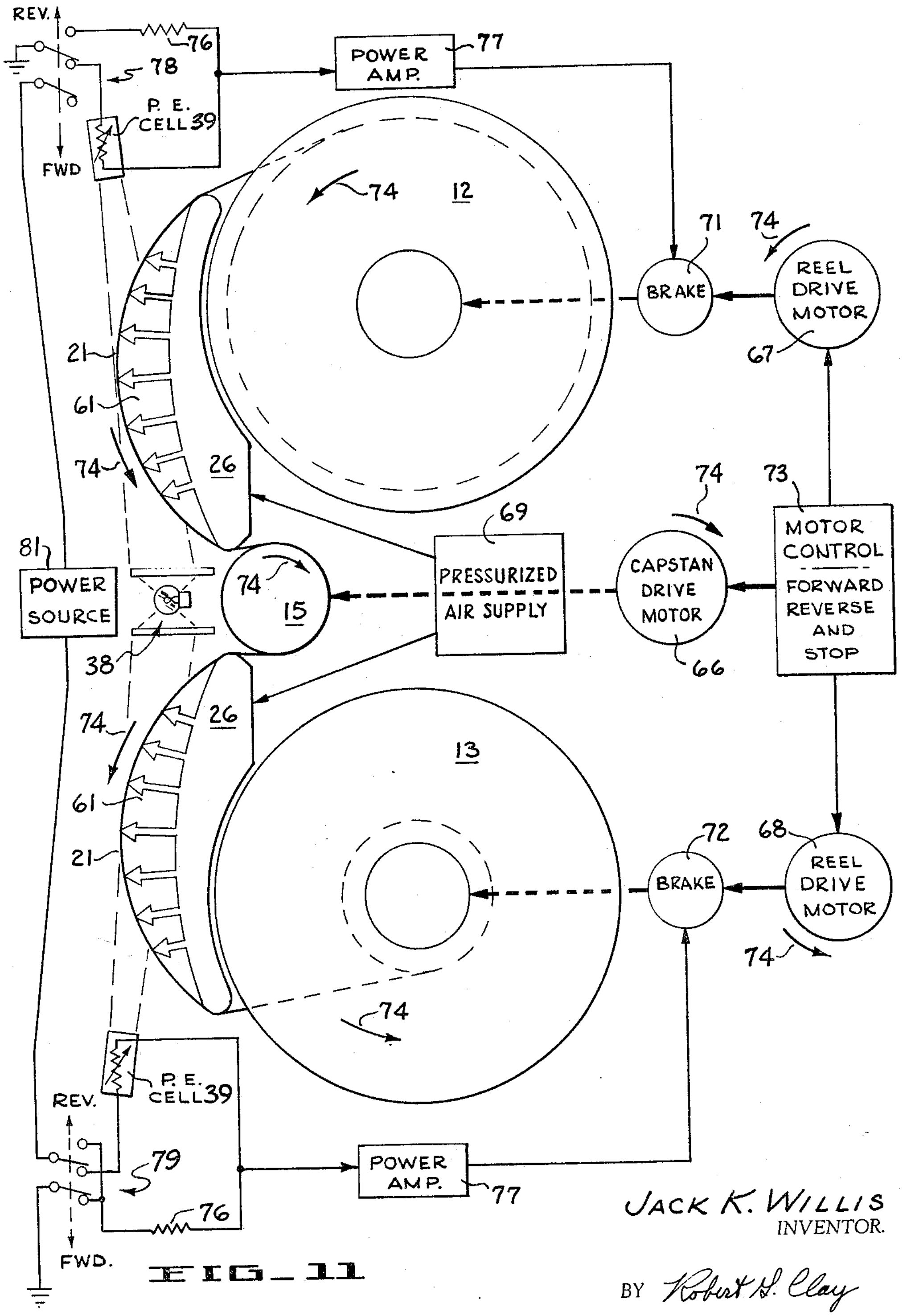
FIGURE 11 is a schematic view illustrating the operation of the invention.

As previously mentioned, control of the amount of tape in the segment 21 is of great importance. The control system is illustrated in FIGURE 11. The capstan 15 and reels 12, 13 are driven by reversible drive motors 66, 67 and 68, respectively. Pressurized air is supplied to the manifolds 26 by a pressurized air supply 69. Each photoelectric cell 39 is coupled, through appropriate circuits as shown, to a brake 71, 72 to apply braking torques to the respective reels in accordance with the amount of tape in the respective segments 21, 22. The brakes 71, 72 may be electromagnetic brakes such as are disclosed in applicant's co-pending application S.N. 285,272 for "Speed Control for a Rotary Device," filed June 4, 1963. The motors 66–68 are controlled by a control device 73 to be energized as a group for motion in either forward or reverse directions, for stopping, and for changing direction. For example in "forward" mode, with the tape, reels, capstan and motors moving in the directions of the respective arrows 74, whenever the amount of tape in segment 21 decreases below the desired amount (e.g., as in starting forward), more light is received by the corresponding photocell 39, and the brake 71 is correspondingly released to permit the motor 67 to apply more driving torque to supply reel 12, speeding up the reel to feed more tape to the segment 21. Conversely when the tape in segment 22 increases above the desired amount (e.g., as in starting forward), the brake 72 is correspondingly released and tape is withdrawn more rapidly from the segment 22 by the takeup reel 13.

The circuits producing this effect are described as follows. Each photocell 39, here shown as a photoresistor, is coupled in parallel with a fixed resistor 76 and to the respective brake through a power amplifier 77. One side of the parallel circuit 39, 76 is coupled to ground through a respective three-pole, double-throw switch 78, 79, and the other side of the parallel circuit is coupled through the switch to a power source 81. The switches 78, 79 are controlled by the control device 73 to couple the photocell associated with the supply reel to ground and the associated resistor 76 to the power source 81, and the photocell associated with the takeup reel to the power source 81 and the associated resistor 76 to ground. Thus, in starting in forward mode as shown in the figure, with the switch 78 thrown to forward position, an increasing amount of light on the photocell, corresponding with shortening of the tape segment 21, causes a decrease in the resistance of the associated photocell, and a lowering of the potential applied to the corresponding amplifier 77, to release the brake 71. Correspondingly, as the tape segment 22 grows during forward starting, the decreased light to the associated photocell 39 causes a rise of the photocell resistance but a corresponding lowering of the potential applied to brake 72, to release this brake. Opposite movements of the tape segments 21, 22, during running, cause corresponding slowing of the reels to correct the tape segment lengths. When the control device 73 is operated to reverse the direction of tape motion, the switches 78, 79 are also reversed, so that the brake of the supply reel (now reel 13) is released when the segment 22 grows shorter and the brake of the takeup reel (now reel 12) is released when the segment 21 grows longer.

Thus there has been described a tape feeding mechanism in accordance with the invention including at least one elongated pressurized air manifold extending substantially tangentially from the peripheral zone of a reel and to the capstan and confronting the tape segment between the reel and capstan so as to blow this segment away from the manifold and to form the segment into a curved bend of less than 180° arc, with the ends of the tape segment engaging or nearly engaging the ends of the manifold as bearings. A pair of flat parallel walls extend from the manifold and confront the two edges of the tape segment. These walls are spaced slightly from the tape edges, and the pressurized air leaking between the tape and walls tends to keep the tape centered on the bearings. A sensing means is provided to control the feeding of the tape by the reels so as to maintain a predetermined amount of tape in the loop, and to confine the loop always to an arc of less than 180°.

What is claimed is:

1. In a tape guide and storage device for use in the feeding of tape between a reel and a capstan and head assembly, the combination comprising:
- means for establishing different air pressures on the two sides of said tape throughout substantially the entire length of the tape segment between said reel and said assembly so that said segment is bowed in a circuate arc throughout said length;
- means for sensing said length of tape in said segment and for controlling the rotation of said reel to maintain said length within a predetermined range.

2. In a tape guide and storage device for use in the feeding of tape between a reel and a capstan and head assembly, the combination comprising:
- means for establishing different air pressures on the two sides of said tape throughout substantially the entire length of the tape segment between said reel and said assembly so that said segment is bowed in a circuate arc throughout said length; and
- means cooperating with said tape and with said first-named means for establishing a pressure chamber having a pair of restricted orifices defined in part by the edges of said tape segment throughout said range of bowing of said tape;
- whereby a variable amount of tape is stored under continuous tension and in centered alignment between said assembly and reel.

3. In a tape guide and storage device for use in the feeding of tape between a reel and a capstan and head assembly, the combination comprising:
- means for establishing different air pressures on the two sides of said tape throughout substantially the entire length of the tape segment between said reel and said assembly so that said segment is bowed in a circuate arc throughout said length;
- means for sensing said length of tape in said segment and for controlling the rotation of said reel to maintain said length within a predetermined range; and
- means cooperating with said tape and with said first-named means for establishing a pressure chamber having a pair of restricted orifices defined in part by the edges of said tape segment throughout said range of bowing of said tape.

4. A tape guide and storage device, comprising:
- means for securing the ends of said tape;
- means defining a pair of bearings spaced along the length of said tape and defining a segment of said tape;
- means defining a pair of parallel walls spaced closely from and confronting the edges of the tape in said segment and extending beyond said tape segment for a multiple of the tape thickness; and
- means for establishing an air pressure differential for urging said segment of tape in a direction normal to the plane thereof and toward said bearings with said air leaking between said walls and tape at all points on the length of said segment;
- whereby a variable amount of tape is stored under continuous tension between said bearings, and the leakage of air between the edges of said tape and said walls tends to centralize said tape between said walls.

5. A tape guide and storage device, comprising:
- means for securing the ends of said tape;
- means defining a pair of bearings spaced along the length of said tape and defining a segment of said tape;
- means for establishing an air pressure differential for urging said segment of tape in a direction normal to the plane thereof and toward said bearings so as to cause said segment to be tensioned and to conform to a continuously curved surface between said bearings; and
- means defining a pair of parallel walls spaced closely from and confronting the edges of the tape in said segment and extending beyond said tape segment for a multiple of the tape thickness;
- whereby a variable amount of tape is stored under continuous tension between said bearings, and the leakage of air between the edges of said tape and said walls tends to centralize said tape between said walls and on said bearings.

6. A tape guide and storage device, comprising:
- means defining a pair of rounded bearings spaced along the length of said tape and defining a segment of said tape;
- means for securing the ends of said tape and for feeding said tape to and from the space between said bearings;
- means for establishing an air pressure differential for urging said segment of tape in a direction normal to the plane thereof and against said bearings so as to cause said segment to be tensioned and to conform to a continuously curved surface between said bearings;
- means defining a pair of parallel walls spaced from and confronting the edges of the tape in said segment; and
- means for sensing the amount of tape in said segment, said last-named means being coupled to said tape feeding means for maintaining the amount of tape in said segment between predetermined limits such that said tape always has a greater radius of curvature than said bearings and a substantial angle of wrap around both of said bearings;

whereby a variable amount of tape is stored under continuous tension between said bearings, and the leakage of air between the edges of said tape and said walls to centralize said tape between said walls and on said bearings.

7. A tape guide and storage device, comprising:

means defining a pair of bearings spaced along the length of said tape and defining a segment of said tape;

means for securing the ends of said tape and for feeding said tape to and from the space between said bearings;

means for establishing an air pressure differential for urging said segment of tape in a direction normal to the plane thereof and against said bearings so as to cause said segment to be tensioned and to conform to a continuously curved surface between said bearings;

means defining a pair of parallel walls spaced from and confronting the edges of the tape in said segment; and means for sensing the amount of tape in said segment, said last-named means being coupled to said tape feeding means for controlling the amount of tape in said segment so that said segment describes an arc that is always substantially less than 180°;

whereby a variable amount of tape is stored under continuous tension between said bearings, and the leakage of air between the edges of said tape and said walls tends to centralize said tape between said walls and on said bearings.

8. A tape guide and storage device, comprising:

means defining a pair of bearings spaced along the length of said tape and defining a segment of said tape;

means for securing the ends of said tape and for feeding said tape to and from the space between said bearings;

means for establishing an air pressure differential for urging said segment of tape in a direction normal to the plane thereof and against said bearings so as to cause said segment to be tensioned and to conform to a continuously curved surface between said bearings;

means defining a pair of parallel walls spaced from and confronting the edges of the tape in said segment; and means for sensing the amount of tape in said segment, said last-named means being coupled to said tape feeding means for maintaining a substantially constant amount of tape in said segment with said segment describing an arc that is always substantially less than 180°;

whereby a variable amount of tape is stored under continuous tensions between said bearings, and the leakage of air between the edges of said tape and said walls tends to centralize said tape between said walls and on said bearings.

9. A tape guide and storage device, comprising:

means defining a pair of bearings spaced along the length of said tape and defining a segment of said tape;

means for securing the ends of said tape and for feeding said tape to and from the space between said bearings;

means for establishing an air pressure differential for urging said segment of tape in a direction normal to the plane thereof and against said bearings so as to cause said segment to be tensioned and to conform to a continuously curved surface between said bearings;

means for sensing the amount of tape in said segment, said last-named means being coupled to said tape feeding means for maintaining a substantially constant amount of tape in said segment with said segment describing an arc that is always substantially less than 180°; and means defining a pair of parallel walls spaced from and confronting the edges of the tape in said segment in all positions of said segment in which said arc is less than 180°;

whereby a variable amount of tape is stored under continuous tension between said bearings, and the leakage of air between the edges of said tape and said walls tends to centralize said tape between said walls and on said bearings.

10. A tape guide and storage device, comprising:

means defining a pair of bearings spaced along the length of said tape and defining a segment of said tape;

means for securing the ends of said tape and for feeding said tape to and from the space between said bearings;

means for establishing an air pressure differential for urging said segment of tape in a direction normal to the plane thereof and against said bearings so as to cause said segment to be tensioned and to conform to a continuously curved surface between said bearings;

means for sensing the amount of tape in said segment, said last-named means being coupled to said tape feeding means for maintaining the amount of tape in said segment between predetermined limits such that said tape always has a substantial angle of wrap around both of said bearings and describes an arc between said bearings of less than 180°; and means defining a pair of parallel walls spaced from and confronting the edges of the tape in said segment in all positions of said segment in which said arc is less than 180°;

whereby a variable amount of tape is stored under continuous tension between said bearings, and the leakage of air between the edge of said tape and said walls tends to centralize said tape between said walls and on said bearings.

11. In a tape transport including a capstan and a pair of reels, a tape guide and storage device, comprising:

means defining a pair of bearings spaced along the length of said tape between said capstan and one of said reels and defining a segment of said tape;

means for operating said capstan and said reels for feeding said tape to and from the space between said bearings;

means for establishing an air pressure differential for urging said segment of tape in a direction normal to the plane thereof and against said bearings so as to cause said segment to be tensioned and to conform to a continuously curved surface between said bearings;

means for sensing the amount of tape in said segment, said last-named means being coupled to said capstan-reel operating and tape feeding means for maintaining the amount of tape in said segment between predetermined limits such that said tape always has a substantial angle of wrap around both of said bearings and describes an arc between said bearings of less than 180°; and means defining a pair of parallel walls spaced from and confronting the edges of the tape in said segment in all positions of said segment in which said arc is less than 180°;

whereby a variable amount of tape is stored under continuous tension between said bearings, and the leakage of air between the edges of said tape and said walls tends to centralize said tape between said walls and on said bearings.

12. In a tape transport including a capstan and a pair of reels, a tape guide and storage device, comprising:

means defining a pair of bearings spaced along the length of said tape between said capstan and one of said reels and defining a segment of said tape;

motor means coupled to said capstan and said reels for feeding said tape to and from the space between said bearings;

brake means coupled to each of said reels to regulate said feeding;

means for establishing an air pressure differential for urging said segment of tape in a direction normal to the plane thereof and against said bearings so as to cause said segment to be tensioned and to conform to a continuously curved surface between said bearings;

means for sensing the amount of tape in said segment, said last-named means being coupled to said brake means for maintaining the amount of tape in said segment between predetermined limits such that said tape always has a substantial angle of wrap around both of said bearings and describes an arc between said bearings of less than 180°; and means defining a pair of parallel walls spaced from and confronting the edges of the tape in said segment in all positions of said segment in which said arc is less than 180°;

whereby a variable amount of tape is stored under continuous tension between said bearings, and the leakage of air between the edges of said tape and said walls tends to centralize said tape between said walls and on said bearings.

13. In a tape transport including a capstan and a pair of reels, a tape guide and storage device, comprising:

a pair of pressurized air manifolds each defining a pair of bearings spaced along the length of said tape, each manifold being mounted between said capstan and one of said reels, and the bearings of each manifold defining a segment of said tape;

motor means coupled to said capstan and said reels for feeding said tape to and from the spaces between said bearings of each manifold;

brake means coupled to each of said reels to regulate said feeding;

pressurized air supply means coupled to said manifolds for establishing an air pressure differential for urging said segment of tape in a direction normal to the plane thereof and against each pair of said bearings so as to cause said segment to be tensioned and to conform to a continuously curved surface between each pair of said bearings;

means for sensing the amount of tape in said segment, said last-named means being coupled to said brake segment between predetermined limits such that said tape always has a substantial angle of wrap around both of said bearings of each manifold and describes an arc of less than 180° between said bearings of each manifold; and means defining a pair of parallel walls spaced from and confronting the edges of the tape in said segment of each manifold in all positions of said segment in which said arc is less than 180°;

whereby a variable amount of tape is stored under continuous tension between said bearings, and the leakage of air between the edges of said tape and said walls tends to centralize said tape between said walls and on said bearings.

14. In a tape transport including a capstan and a pair of reels, a tape guide and storage device, comprising:

a pair of pressurized air manifolds each defining a pair of bearings spaced along the length of said tape, each manifold being mounted between said capstan and one of said reels, and the bearings of each manifold defining a segment of said tape;

three drive motors coupled respective to said capstan and said reels for feeding said tape to and from the spaces between said bearings of each manifold;

control means coupled to said motors for starting and operating said motors in forward and reverse directions and for stopping said motors;

brake means coupled to each of said reels to regulate said feeding in cooperation with said motors and control means;

pressurized air supply means coupled to said manifolds for establishing an air pressure differential for urging said segment of tape in a direction normal to the plane thereof and against each pair of said bearings so as to cause said segment to be tensioned and to conform to a continuously curved surface between each pair of said bearings;

means for sensing the amount of tape in said segment, said last-named means being coupled to said brake means for maintaining the amount of tape in said segment between predetermined limits such that said tape always has a substantial angle of wrap around both of said bearings of each manifold and describes an arc of less than 180° between said bearings of each manifold; and means defining a pair of parallel walls spaced from and confronting the edges of the tape in said segment of each manifold in all positions of said segment in which said arc is less than 180°;

whereby a variable amount of tape is stored under continuous tension between said bearings, and the leakage of air between the edges of said tape and said walls tends to centralize said tape between said walls and on said bearings.

15. In a tape transport including a capstan and a pair of reels, a tape guide and storage device, comprising:

a pair of pressurized air manifolds each mounted between said capstan and one of said reels and presenting an elongated and convexly outwardly curved wall confronting a corresponding segment of said tape, each of said manifolds having a hollow interior chamber defined in part by the respective curved wall thereof, and each curved wall having a plurality of ports formed in the length thereof for directing said pressurized air from said chamber toward and against said tape;

each of said curved walls terminating in a pair of rounded portions defining spaced bearings for the corresponding tape segment;

three drive motors coupled respectively to said capstan and said reels for feeding said tape to and from the spaces between said bearings of each manifold;

control means coupled to said motors for starting and operating said motors in forward and reverse directions and for stopping said motors;

brake means coupled to each of said reels to regulate said feeding in cooperation with said motors and control means;

pressurized air supply means coupled to said manifold chambers for establishing an air pressure differential for urging the respective segment of tape in a direction normal to the plane thereof and against the corresponding pair of bearings so as to cause said segment to be tensioned and to conform to a continuously curved surface between each pair of said bearings;

means for sensing the amount of tape in each of said segments, said last-named means being coupled to said brake means for maintaining the amount of tape in each segment between predetermined limits such that said tape always has a substantial angle of wrap around both of said bearings of each manifold and describes an arc of less than 180° between said bearings of each manifold; and means defining a pair of parallel walls spaced from and confronting the edges of the tape in said segment of each manifold in all positions of said segment in which said arc is less than 180°;

whereby a variable amount of tape is stored under continuous tension between said bearings, and the leakage of air between the edges of said tape and said walls tends to centralize said tape between said walls and on said bearings.

16. In a tape transport including a capstan and a pair of reels, a tape guide and storage device, comprising:

at least one pressurized air manifold mounted between said capstan and one of said reels and presenting an elongated and convexly outwardly curved wall confronting a corresponding segment of said tape, said manifold having a hollow interior chamber defined in part by said curved wall thereof, and said curved wall having a plurality of ports formed in the length thereof for directing said pressurized air from said chamber toward and against said tape;

each of said curved walls terminating in a pair of rounded portions defining spaced bearings for the corresponding tape segment;

pressurized air supply means coupled to said manifold chamber for establishing an air pressure differential for urging said segment of tape in a direction normal to the plane thereof and against said pair of bearings so as to cause said segment to be tensioned and to conform to a continuously curved surface between said bearings;

means for operating said capstan and reels for feeding said tape to and from the space between said bearings;

means for sensing the amount of tape in said segment, said last-named means being coupled to said tape feeding means for maintianing the amount of tape in said segment between predetermined limits such that said tape always has a substantial angle of wrap around both of said bearings; and means defining a pair of parallel walls spaced from and confronting the edges of the tape in said segment;

whereby a variable amount of tape is stored under continuous tension between said bearings, and the leakage of air between the edges of said tape and said walls tends to centralize said tape between said walls and on said bearings.

17. In a tape transport including a capstan and a pair of reels, a tape guide storage device, comprising:

at least one elongated pressurized air manifold mounted generally tangent to one of said reels and extending substantially to said capstan and presenting an elongated and convexly outwardly curved wall confronting a corresponding segment of said tape, said manifold having a hollow interior chamber defined in part by said curved wall thereof, and said curved wall having a plurality of ports formed in the length thereof for directing said pressurized air from said chamber toward and against said tape;

each of said curved walls terminating in a pair of rounded portions defining spaced bearings for the corresponding tape segment;

pressurized air supply means coupled to said manifold chamber for establishing an air pressure differential for urging said segment of tape in a direction normal to the plane thereof and against said pair of bearings so as to cause said segment to be tensioned and to conform to a continuously curved surface between said bearings;

means for operating said capstan and reels for feeding said tape to and from the space between said bearings;

means for sensing the amount of tape in said segment, said last-named means being coupled to said tape feeding means for maintaining the amount of tape in said segment between predetermined limits such that said tape always has a substantial angle of wrap around both of said bearings; and said manifold having a pair of parallel walls extending therefrom and spaced from and confronting the edges of the tape in said segment;

whereby a variable amount of tape is stored under continuous tension between said bearings, and the leakage of air between the edges of said tape and said walls tends to centralize said tape between said walls and on said bearings.

18. In a tape transport including a capstan and a pair of reels, a tape guide and storage device, comprising:

at least one elongated pressurized air manifold mounted generally tangent to one of said reels and extending substantially to said capstan and presenting an elongated and convexly outwardly curved wall confronting a corresponding segment of said tape, said manifold having a hollow interior chamber defined in part by said curved wall thereof, and said curved wall having a plurality of ports formed in the length thereof for directing said pressurized air from said chamber toward and against said tape;

each of said curved walls terminating in a pair of rounded portions defining spaced bearings for the corresponding tape segment;

pressurized air supply means coupled to said manifold chamber for establishing an air pressure differential for urging said segment of tape in a direction normal to the plane thereof and against said pair of bearings so as to cause said segment to be tensioned and to conform to a continuously curved surface between said bearings;

means for operating said capstan and reels for feeding said tape to and from the space between said bearings;

a light source positioned adjacent one of said bearings and a photocell positioned adjacent the other of said bearings so that a portion of the light from said light source is masked from said photocell by said tape segment, with the amount of said masked light varying as a function of the amount of tape in said segment, said photocell being coupled to said tape feeding means for maintaining the amount of tape in said segment between predetermined limits such that said tape always has a substantial angle of wrap around both of said bearings; and said manifold having a pair of parallel walls extending therefrom and spaced from and confronting the edges of the tape in said segment;

whereby a variable amount of tape is stored under continuous tension between said bearings, and the leakage of air between the edges of said tape and said walls tends to centralize said tape between said walls and on said bearings.

19. In a tape transport including a capstan and a pair of reels, a tape guide and storage device, comprising:

a pair of elongated pressurized air manifolds each mounted generally tangent to one of said reels and extending substantially to said capstan and each presenting an elongated and convexly outwardly curved wall confronting a corresponding segment of said tape, each manifold having a hollow interior chamber defined in part by said curved wall thereof, and said curved wall having a plurality of ports formed in the length thereof for direct said pressurized air from said chamber toward and against said tape;

each of said curved walls terminating in a pair of rounded portions defining spaced bearings for the corresponding tape segment;

pressurized air supply means coupled to said manifold chambers for establishing an air pressure differential for urging said segments of tape in a direction normal to the plane thereof and against said corresponding pair of bearings so as to cause each of said segments to be tensioned and to conform to a continuously curved surface between said bearings;

three drive motors coupled respectively to said capstan and said reels for feeding said tape to and from the spaces between said bearings of each manifold;

control means coupled to said motors for starting and operating said motors in forward and reverse directions for stopping said motors;

brake means coupled to each of said reels to regulate said feeding in cooperation with said motors and control means;

a light source positioned adjacent one of said bearings of each manifold and a pair of photocells each positioned adjacent the other of said bearings of each manifold so that a portion of the light from said light source is masked from each photocell by the corresponding tape segment, with the amount of said masked light varying as a function of the amount of tape in each segment, said photocells being coupled to said brake means for maintaining the amount of tape in each segment between predetermined limits such that said tape always has a substantial angle of wrap around both of said bearings of each manifold and each tape segment describes an arc of less than 180°; and each manifold having a pair of parallel walls extending therefrom and spaced from and confronting the edges of the tape in the corresponding segment;

whereby a variable amount of tape is stored under continuous tension between said bearings, and the leakage of air between the edges of said tape and said walls tends to centralize said tape between said walls and on said bearings.

References Cited by the Examiner

UNITED STATES PATENTS 2,678,173 5/1954 Phelps ---------------- 242—75.3

FOREIGN PATENTS 1,133,810 4/1957 France.

FRANK J. COHEN, *Primary Examiner.*

LEONARD D. CHRISTIAN, *Examiner.*